219-121 SR
MTR04 XR 3,293,429

Dec. 20, 1966 H. LEBOUTET ET AL 3,293,429

APPARATUS FOR DETECTION AND INTENSITY MEASUREMENT OF HIGH ENERGY CHARGED PARTICLE BEAMS

Filed Aug. 17, 1962 2 Sheets-Sheet 1

INVENTORS:
H. LEBOUTET et R. JEAN
BY Paul M. Craig, Jr.
ATTORNEY

FIG. 3
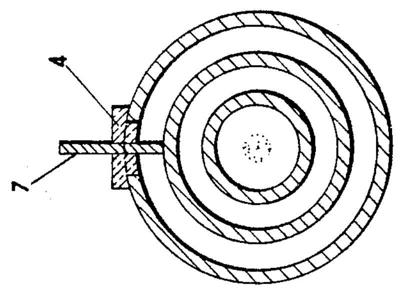
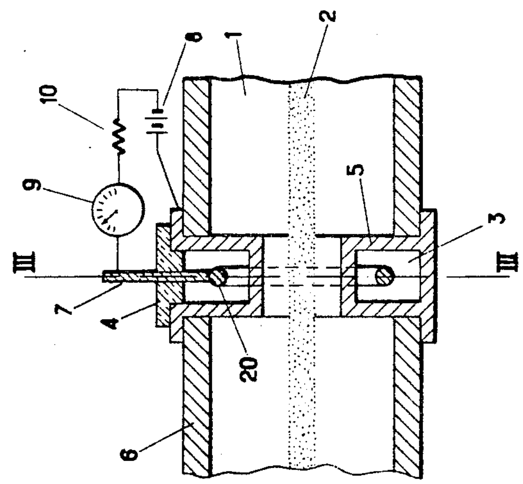
FIG. 2
INVENTORS:
H. LEBOUTET et R. JEAN
BY Paul M. Craig, Jr.
ATTORNEY United States Patent Office 3,293,429

Patented Dec. 20, 1966

3,293,429

APPARATUS FOR DETECTION AND INTENSITY MEASUREMENT OF HIGH ENERGY CHARGED PARTICLE BEAMS

Hubert Leboutet and Roger Jean, Paris, France, assignors to CSF-Compagnie Generale de Telegraphie Sans Fil, Paris, France Filed Aug. 17, 1962, Ser. No. 218,227
Claims priority, application France, Sept. 7, 1961, 872,547
16 Claims. (Cl. 250—41.9)

The present invention relates to machines, such as accelerators, which produce particle beams of a high energy level and, more particularly, to the detection and intensity-measurement of such beams.

It has been found experimentally that any charged particle beam having a high energy level ionizes the adjoining space to a degree which varies with the proximity of the beam and the intensity thereof.

Making profitable use of this experimental observation, the present invention aims at realizing simple and practical means which permit to determine the presence of a particle beam in a closed duct or the like, to detect the location of such beam, and eventually to measure the intensity thereof by means located essentially outside of the beam to be measured.

According to the present invention, a device of this kind is characterized in that it comprises one or several ionization chambers placed in proximity to the beam to be measured, and means permitting to measure the degree of ionization in these chambers.

Accordingly, it is an object of the present invention to provide measuring apparatus for detecting the location and/or determining the intensity of a charged particle beam within a particle accelerator which is simple in structure, relatively inexpensive in installation and easy to operate.

It is another object of the present invention to provide a measuring apparatus for charged particle accelerators which may be located outside of the enclosure through which travels the high energy beam, yet provides a very high sensitivity for extremely accurate measurements.

Still another object of the present invention resides in the provision of a simple measuring arrangement which enables a visual indication of the energy spectrum of the accelerator.

These and other objects, features and advantages of the present invention will become more obvious from the following description when taken in connection with the accompanying drawing, which shows, for purposes of illustration only, several embodiments in accordance with the present invention, and wherein FIGURE 1 is a partial cross sectional view of one embodiment of a device according to the present invention;

FIGURE 2 is a partial cross sectional view of a modified embodiment of a measuring device in accordance with the present invention;

FIGURE 3 is a transverse cross-sectional view taken along line III—III of FIGURE 2;

Figure 1:
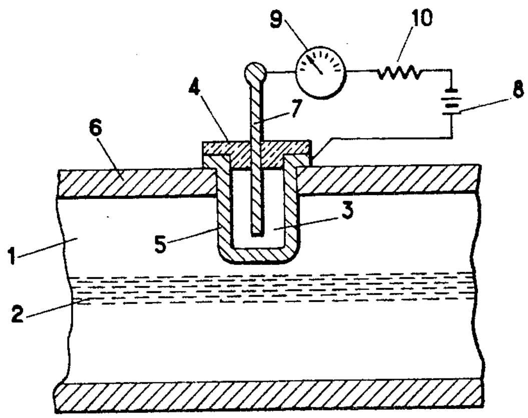

Referring now to the drawing, wherein like reference numerals are used throughout the various views to designate like parts, and more particularly to FIGURE 1 thereof, reference numeral 1 designates in this figure a section of a closed duct or guide on the inside of which propagates a beam 2 of high energy particles. An ionization chamber 3 is provided, in accordance with the present invention, in direct proximity to the place of the passage or path of the beam 2. The chamber 3, closed by an insulating cover or plug 4, comprises a metallic wall 5 accommodated within the metallic wall 6 of the duct or enclosure 1.

A conductive probe 7, extending through the insulating cover 4, is inserted into the ionization chamber. Additionally, a circuit comprising a current source 8 in series with a galvanometer 9 and a resistance 10, is connected between the probe 7 and the wall 5 of the ionization chamber 3, the latter being filled with a gas, which may be air.

During operation, the passage or flow of high energy particles of the beam 2 through the enclosure or duct 1 causes an ionization of the gas contained in chamber 3.

Without prejudice to the validity of the present invention, it may be assumed that this ionization is due to the action of particles from peripheral zones of the beam, the latter having a Gaussian density distribution, i.e., a density decreasing very rapidly between the axis of the beam and the peripheral zone thereof.

The source 8 then supplies a current measured by the galvanometer 9, and this current is a function of the ionization, itself being a function of the proximity and of the intensity of the beam 2. By means of a prior calibration of the galvanometer 9, the indications given thereby thus furnish the value for the intensity of the beam under study.

The pressure and composition of the gas filling the ionization chamber 3 are chosen at will in order to obtain the best sensitivity with respect to the problem at hand. It has been found, however, that starting from energies of several millions of electron-volts, air at atmospheric pressure yields very satisfactory results.

The wall 5 of the ionization chamber 3 may be chosen in dependence on the nature of the flux of the particles. It is, of course, of interest to choose materials in which the induced radioactivity has a very short period. In any case, the degree of ionization obtained is a function of the materials employed and of the thickness thereof.

FIGURES 2 and 3 show a modified embodiment of the present invention, FIGURE 3 being a transverse cross-sectional view taken along line III—III of FIGURE 2. In these two figures, the ionization chamber 3 has toroidal shape and completely surrounds the particle beam 2 propagating along the axis of a cylindrical duct or enclosure 6. A metallic ring 20, disposed on the inside of the torc formed by walls 5 and arranged concentrically thereto and to the cylinder 6, forms the probe for the ionization chamber and a metallic rod 7 extending through the insulating plug 4 connects the probe with the external circuit comprising the galvanometer 9, the resistance 10 and the voltage source 8, which terminates at the metallic wall 5 of the ionization chamber.

It will be noted that, in the embodiment of FIGURE 1, the indications given by the galvanometer 9 vary when the particle beam 2 loses its centered position. In contrast thereto, in the modified embodiment of FIGURES 2 and 3, when the beam loses its centered position, the ionization is more intense over a part of the toroidal chamber but for a slight off center condition, the total result remains the same and the indication furnished by the measuring apparatus is a function only of the intensity of the beam.

Figure 4:
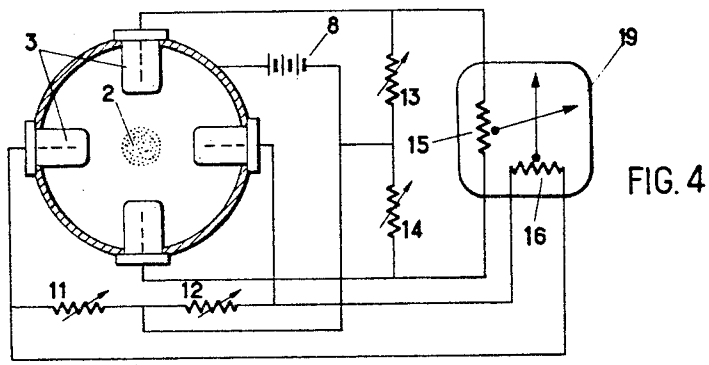
FIGURE 4 is a schematic view of still another modified embodiment of a measuring device according to the present invention.

FIGURE 4 represents a device comprising four ionization chambers 3 disposed symmetrically around the beam 2, and a measuring apparatus 19 with crossed needles. The ionization chambers 3 are fed from the voltage source 8 across resistances 11, 12, 13 and 14, respectively, and each of the resistances 15 and 16 of the measuring apparatus 19 is traversed by currents in opposite directions coming from two diametrically opposite ionization chambers.

After calibration of resistances 11, 12, 13 and 14, this device renders it possible to directly determine the position of beam 2 by the crossing of the needles of the apparatus 19. This apparatus is very sensitive to decentering as the ionization increases very rapidly with the nearness of the beam; it is precise, therefore, only in proximity to the center and tends to exaggerate the off-center indications, which constitutes an appreciable advantage.

Figure 5:
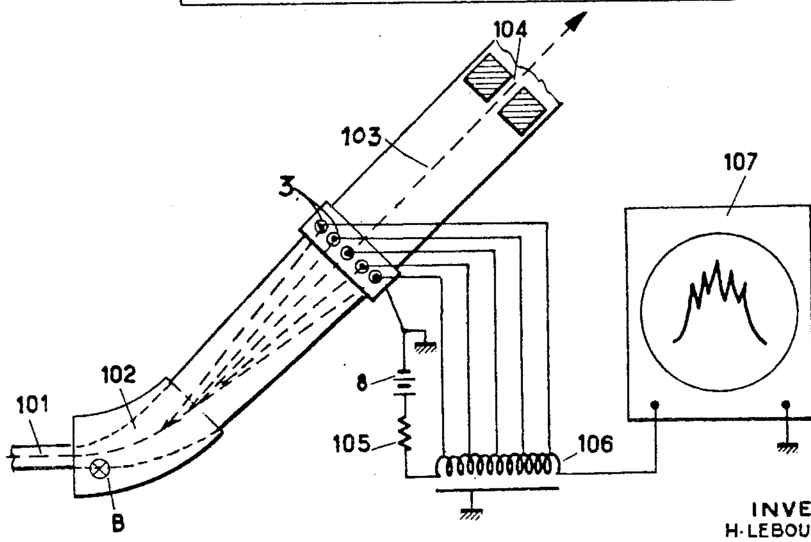
FIGURE 5 illustrates schematically an example of application of the present invention in pulsed particle accelerators.

The present invention lends itself to numerous applications and FIGURE 5 shows one example of such an application for the case of a pulsed accelerator.

In that figure, a particle beam 101 has been schematically shown as originating in the accelerator and being directed toward an analyzing electromagnet 102, generally utilized in combination with the accelerator to extract from the principal beam a particle beam 103, of known energy, within a band delimited by an analyzing slot 104. The magnetic field furnished by the magnet 102 and represented by the cross B is perpendicular to the plane of the drawing.

Just ahead of the analyzing slot 104 and in proximity to the beam, there are disposed ionization chambers 3—numbering five in the case of this figure—and being of the same type as any of those illustrated in the previous figures.

The outer walls of the ionization chambers 3 are connected to a pole or terminal of the voltage source 8 by a common connection, and the supply of the central electrodes or probes 7 of the chambers 3 is made across a resistance 105 and progressively increasing sections of a delay-line 106 which is connected, on the other hand, to a cathode ray oscilloscope 107. The latter is horizontally scanned or swept by a time base of sawtooth wave form (not shown).

During operation, the magnetic field of the analyzer 102 causes the particles of beam 101 to deviate by an angle the larger the lower the energy thereof. In the vicinity of chambers 3, the particles are thus classified in the order of their respective energies, and the currents discharged by the various chambers 3 furnish the measure of intensity of the particles with different energies.

As the accelerator is operated in a pulsed manner at a recurrence frequency $f$, the time basis of the oscilloscope 107 is adjusted to the same recurrence frequency, and the delay line 106 is given such dimensions that the total delay thereof is less than $1/f$. An image of the energy spectrum of the accelerator is thereby obtained on the screen of the oscilloscope 107, which is extremely valuable for facilitating the adjustments of such machine.

While we have shown and described several embodiments in accordance with the present invention, it is understood that the same is not limited thereto, but is susceptible of many changes and modifications within the spirit and scope of the present invention, and we, therefore, do not wish to be limited to the details shown and described herein, but intend to cover all such changes and modifications as are encompassed by the scope of the appended claims.

We claim:

1. In combination with an evacuated duct means within which a high energy particle beam is adapted to propagate, at least one ionization chamber located adjacent the path of the beam, and measuring means for measuring the degree of ionization within said chamber to thereby detect the beam.

2. In combination with evacuated duct means operable to enable movement therethrough of a particle beam, the energy of said particles being of the order of several mega electron volts, at least one ionization chamber filled with air at atmospheric pressure and located adjacent said beam, and measuring means for measuring the degree of ionization in said chamber to thereby detect the presence of said beam.

3. A measuring device for use with an evacuated duct means supporting the movement of a particle beam with the energy of the particles thereof being of the order of several mega-electron-volts, comprising ionization chamber means filled with an ionizable gas at predetermined pressure and operatively associated with said duct means adjacent the path of said beam, and means for detecting said beam and measuring the intensity thereof by measuring the degree of ionization within said chamber means.

4. In combination with an evacuated duct having wall means within which a high energy particle beam is adapted to propagate, at least one ionization chamber located adjacent the path of the beam and including further wall means projecting into said duct through said first-mentioned wall means and measuring means for measuring the degree of ionization within said chamber to thereby detect the beam.

5. In combination with an evacuated duct having wall means within which a high energy particle beam is adapted to propagate, ionization chamber means located adjacent the path of the beam and including further wall means projecting into said duct through said first-mentioned wall means, said further wall means substantially surrounding the beam and measuring means for measuring the degree of ionization within said chamber means to thereby detect the beam and measure the intensity thereof.

6. In combination with an evacuated duct having wall means within which a high energy particle beam is adapted to propagate, ionization chamber means located near the path of the beam and including further wall means projecting into said duct through said first-mentioned wall means, said further wall means substantially surrounding the beam and measuring means for measuring the degree of ionization within said chamber means to thereby detect the beam and measure the intensity thereof including a probe electrode of a shape substantially surrounding said beam and located within said chamber means.

7. A measuring device for use with evacuated duct means enabling the movement of a particle beam having a relatively high energy level of the particles thereof, comprising ionization chamber means filled with an ionizable gas, said ionization chamber means being operatively associated with said duct means adjacent the path of said beam, and means for measuring the intensity of said beam by measuring the degree of ionization within said chamber means.

8. In combination with an evacuated duct means of substantially circular shape within which a high energy particle beam is adapted to propagate, two pairs of ionization chambers located near the path of the beam, substantially symmetrically about the periphery of said duct means, and measuring means for measuring the degree of ionization within said chambers to thereby measure the intensity of said beam including circuit means interconnecting both of said pairs for determning also the position of said beam within said duct means.

9. In combination with an evacuated duct means within which a high energy particle beam is adapted to propagate, a plurality of chambers located adjacent the path of the beam and transversely aligned with respect to the beam along the periphery of said duct means, and measuring means for measuring the degree of ionization within said chambers to thereby detect the beam and measure the intensity thereof, including circuit means for respectively delaying the transmission of measured values by each of said chambers to enable sequential display of said values on a scope.

10. A measuring device for use with evacuated duct means enabling the movement of a particle beam having a relatively high energy level of the particles thereof, comprising ionization chamber means filled with an ionizable gas, said ionization chamber means being operatively associated with said duct means, and means for measuring the intensity of said beam by measuring the degree of ionization within said chamber means including means for determining the position of said beam within said duct means.

11. A measuring device for use with evacuated duct means enabling the movement of a particle beam having a relatively high energy level of the particles thereof, comprising ionization chamber means filled with an ionizable gas, said ionization chamber means being operatively associated with said duct means adjacent the path of said beam, and means for measuring the intensity of said beam by measuring the degree of ionization within said chamber means including means for determining the position of said beam within said duct means and means for simultaneously analyzing the energy spectrum of said beam.

12. A measuring device for use with a pulsed accelerator having evacuated duct means enabling therethrough the movement of a particle beam with the particles thereof having a relatively high energy, comprising ionization chamber means filled with an ionizable gas and operatively associated with said duct means adjacent the path of said beam, means for separating the beam into a plurality of beams according to the energy levels of the particles thereof, and means for measuring the intensity of said last-mentioned beams by measuring the degree of ionization within said chamber means.

13. A measuring device for use with evacuated duct means enabling the movement of a particle beam having a relatively high energy level of the particles thereof, comprising ionization chamber means filled with an ionizable gas, said ionization chamber means being operatively associated with said duct means adjacent the path of said beam, and means for measuring the intensity of said beam by measuring the degree of ionization within said chamber means including means for simultaneously analyzing the energy spectrum of said beam.

14. A measuring device for use with a pulsed accelerator having evacuated duct means enabling therethrough the movement of a particle beam with the particles thereof having a relatively high energy, comprising ionization chamber means filled with an ionizable gas and operatively associated with said duct means, means for separating the beam into a plurality of beams according to the energy levels of the particles thereof, and means for measuring the intensity of said last-mentioned beams by measuring the degree of ionization within said chamber means including means for visually displaying the energy spectrum of said last-mentioned beams.

15. A measuring and indicating device for visually indicating the energy spectrum of a particle beam propagating through an evacuated duct with the energy level of the particles thereof being relatively high, comprising means operatively associated with said duct means and located externally thereof including ionizable means for measuring the intensity of the particles in said beam by measuring the degree of ionization within said ionizable means and means for visually indicating said spectrum operatively connected with said ionizable means.

16. A measuring and indicating device for visually indicating the energy spectrum of a particle beam propagating through an evacuated duct with the energy level of the particles thereof being of the order of several mega-electron-volts, comprising means operatively associated with said duct means and located externally thereof including ionizable means for measuring the intensity of the particles in said beam by measuring the degree of ionization within said ionizable means and means including a cathode ray scope for visually indicating said spectrum operatively connected with said ionizable means.

References Cited by the Examiner

UNITED STATES PATENTS

| | | | |
|---|---|---|---|
| 2,616,053 | 10/1952 | Holloway | 250—41.9 |
| 2,640,948 | 6/1953 | Burrill | 250—49.5 |
| 2,834,888 | 5/1958 | Norton | 250—41.9 |
| 2,894,137 | 7/1959 | York | 250—41.9 |
| 2,899,582 | 8/1959 | Hermsen et al. | 313—93 |
| 2,946,892 | 7/1960 | Bas-Taymaz | 250—99 |

RALPH G. NILSON, *Primary Examiner.*

W. F. LINDQUIST, *Assistant Examiner.*